US011735139B2

United States Patent
Yamada et al.

(10) Patent No.: US 11,735,139 B2
(45) Date of Patent: Aug. 22, 2023

(54) DISPLAY SYSTEM, DISPLAY METHOD, AND TRANSPARENT DISPLAY BODY

(71) Applicant: AGC Inc., Tokyo (JP)

(72) Inventors: Naruki Yamada, Tokyo (JP); Yukihiro Tao, Tokyo (JP); Yoshinori Iguchi, Tokyo (JP); Osamu Iwata, Tokyo (JP)

(73) Assignee: AGC Inc., Tokyo (JP)

( * ) Notice: Subject to any disclaimer, the term of this patent is extended or adjusted under 35 U.S.C. 154(b) by 97 days.

(21) Appl. No.: 17/452,804

(22) Filed: Oct. 29, 2021

(65) Prior Publication Data

US 2022/0051643 A1 Feb. 17, 2022

Related U.S. Application Data

(63) Continuation of application No. PCT/JP2020/017637, filed on Apr. 24, 2020.

(30) Foreign Application Priority Data

May 7, 2019 (JP) .............................. JP2019-087852

(51) Int. Cl.
 *G09G 5/10* (2006.01)
 *G02B 27/01* (2006.01)
 *G09G 3/00* (2006.01)
(52) U.S. Cl.
 CPC .............. *G09G 5/10* (2013.01); *G09G 3/002* (2013.01); *G09G 2360/141* (2013.01); *G09G 2360/144* (2013.01); *G09G 2380/10* (2013.01)

(58) Field of Classification Search
 CPC .... G09G 5/10; G09G 3/002; G09G 2360/141; G09G 2360/144; G09G 2380/10;
 (Continued)

(56) References Cited

U.S. PATENT DOCUMENTS 10,162,174 B2  12/2018 Iwami
10,732,497 B2  8/2020 Yamaguchi et al.
(Continued)

FOREIGN PATENT DOCUMENTS

JP   2017-090617 A    5/2017
JP   2017-211454 A    11/2017
WO   WO 2017/221528 A1  12/2017

*Primary Examiner* — Antonio Xavier
(74) *Attorney, Agent, or Firm* — Oblon, McClelland, Maier & Neustadt, L.L.P.

(57) ABSTRACT

A display-system includes a transparent-display-body having a first-surface and a second-surface opposite to the first-surface, a sensor to detect a brightness of the transparent-display-body or a brightness around the transparent-display-body, an arithmetic-unit configured to derive, based on the brightness detected by the sensor, a background luminance caused by outside-light as when the transparent-display-body is viewed from a side of the second-surface, and a controller to cause video to be displayed on the first-surface, wherein where rear-show-through-luminance that is a luminance of the video that occurs on the side of the second-surface is denoted as BB and the background luminance is denoted as SB, the controller controls a video luminance in accordance with the background luminance derived by the arithmetic-unit such that (BB/SB) is less than or equal to a predetermined-contrast-value, the video luminance being a luminance at which the video is to be displayed on the first-surface.

17 Claims, 7 Drawing Sheets

(58) Field of Classification Search
CPC ............ G09G 2358/00; G02B 27/0101; G02B 2027/0118; G03B 21/2053; G03B 21/62; B60K 2370/152; B60K 2370/27; B60K 2370/336; B60K 2370/349; B60K 2370/48; B60K 2370/52; B60K 2370/693; B60K 2370/785; B60K 35/00; H04N 9/3155; H04N 5/58; H04N 9/3194; H04N 9/3182

See application file for complete search history.

(56) References Cited

U.S. PATENT DOCUMENTS

| | | | | |
|---|---|---|---|---|
| 2009/0243819 | A1* | 10/2009 | Pala | B60K 35/00 340/425.5 |
| 2017/0205701 | A1* | 7/2017 | Ide | G09F 19/18 |
| 2018/0339591 | A1* | 11/2018 | Suzuki | B60K 35/00 |
| 2019/0172419 | A1* | 6/2019 | Hwang | G06T 5/009 |

* cited by examiner

DISPLAY SYSTEM, DISPLAY METHOD, AND TRANSPARENT DISPLAY BODY

CROSS-REFERENCE TO RELATED APPLICATIONS

This application is a continuation of International Application PCT/JP2020/017637, filed on Apr. 24, 2020 and designated the U.S., which is based on and claims priority to Japanese Patent Application No. 2019-087852 filed on May 7, 2019, with the Japan Patent Office. The entire contents of these applications are incorporated herein by reference.

BACKGROUND OF THE INVENTION

1. Field of the Invention

The disclosures herein relate to a display system, a display method, and a transparent display body.

2. Description of the Related Art

Conventionally, so-called reflective-type video display transparent members have been known that enable background light to pass through owing to their transparency and also display video light, which is projected from a projector installed on a video-display-side surface, viewable as video by an observer on the video-display-surface side. Among these members, a screen having transparency can display video by reflecting projected video light with scenery that is beyond the screen also viewable in see-through fashion while the screen is in a fixed state, that is, for example, affixed to a highly transparent member or sandwiched between highly transparent members such as window glass, a vehicle windshield, or the like. As such, the demand for such a transparent screen is on the rise owing to the high quality of such a transparent screen in terms of design and so on.

With respect to the reflective-type video display transparent member, however, when video light is projected at an angle, there are cases where a portion of the video light is emitted upward toward a side of the video display transparent member in the thickness direction opposite to the side where the video source is situated rather than in the direction of the observer. There has been a problem in that when such kind of unnecessary video light (leak light) occurs on the upper portion or the like of a screen in particular, the video unwantedly shows on the ceiling or the like, and this consequently causes, for example, the design as a video display device to be decreased. Also, in the reflective-type video display transparent member, video light passes through the surface opposite to the video display surface (this opposite surface hereinafter is also referred to as "rear surface"), causing the video to be reflected on the rear surface (hereinafter also referred to as "rear show-through), and consequently an observer on a side opposite to the projector can notice the projected video. When such rear show-through occurs, there is also a possibility that the privacy of the intended observer observing the reflected light on the same side as the projector will be compromised.

In order to solve this problem, attempts have been made to reduce leak light by stacking anisotropic absorption films onto the video display transparent member (see Patent Documents 1 and 2, for example). However, these methods were problematic in that the stacking of the anisotropic absorption films leads to the occurrence of diffraction, reduced transparency, increased haze, and this in turn leads to decreased viewability.

In contrast to this, a method by which variable dimming members are stacked on a video display transparent member to reduce leak light and rear show-through (see Patent Document 3, for example) is known.

CITATION LIST

Patent Literature

[Patent Document 1] International Publication No. 2017-221528
[Patent Document 2] Japanese Unexamined Patent Application Publication No. 2017-211454
[Patent Document 3] Japanese Unexamined Patent Application Publication No. 2017-090617

SUMMARY OF THE INVENTION

Problem to be Solved by Invention

In order to address this, the present disclosure provides a display system, a display method, and a transparent display body that are capable of suppressing rear show-through of video.

According to one aspect of the present disclosure, a display system is provided that includes a transparent display body having a first surface and a second surface opposite to the first surface;

a sensor to detect a brightness of the transparent display body or a brightness around the transparent display body;

an arithmetic unit configured to derive, based on the brightness detected by the sensor, a background luminance caused by outside light as when the transparent display body is viewed from a side of the second surface; and a controller to cause video to be displayed on the first surface, wherein where rear show-through luminance that is a luminance of the video that occurs on the side of the second surface is denoted as BB and the background luminance is denoted as SB, the controller controls a video luminance in accordance with the background luminance derived by the arithmetic unit such that (BB/SB) is less than or equal to a predetermined contrast value, the video luminance being a luminance at which the video is to be displayed on the first surface.

According to another aspect of the present disclosure a display method is provided that includes:

detecting a brightness of a transparent display body or a brightness around the transparent display body, the transparent display body having a first surface and a second surface opposite to the first surface;

deriving, based on the brightness detected by the sensor, a background luminance caused by outside light as when the transparent display body is viewed from a side of the second surface; and controlling, in a case where video is to be displayed on the first surface and where rear show-through luminance that is a luminance of the video that occurs on the side of the second surface is denoted as BB and the background luminance is denoted as SB, a video luminance in accordance with the derived background luminance such that (BB/SB) is less than or equal to a contrast value that is predetermined, the video luminance being a luminance at which the video is to be displayed on the first surface.

According to yet another aspect of the present disclosure a transparent display body is provided that includes a first surface and a second surface opposite to the first surface, the transparent display body being for displaying video on the first surface, and the transparent display body characterized in that:

where rear show-through luminance that is a luminance of the video that occurs on a side of the second surface is denoted as BB and a background luminance caused by outside light as when the transparent display body is viewed from a side of the second surface is denoted as SB, (BB/SB) becomes less than or equal to a predetermined contrast value in response to a control signal that controls a video luminance being input, the video luminance being a luminance at which the video is to be displayed on the first surface.

Advantageous Effects of Invention

According to at least one embodiment, a display system, a display method, and a transparent display body capable of suppressing rear show-through of video can be provided.

DESCRIPTION OF THE PREFERRED EMBODIMENTS

In the following, embodiments are described with reference to the accompanying drawings. It should be noted that these embodiments do not limit the present invention.

Figure 1:
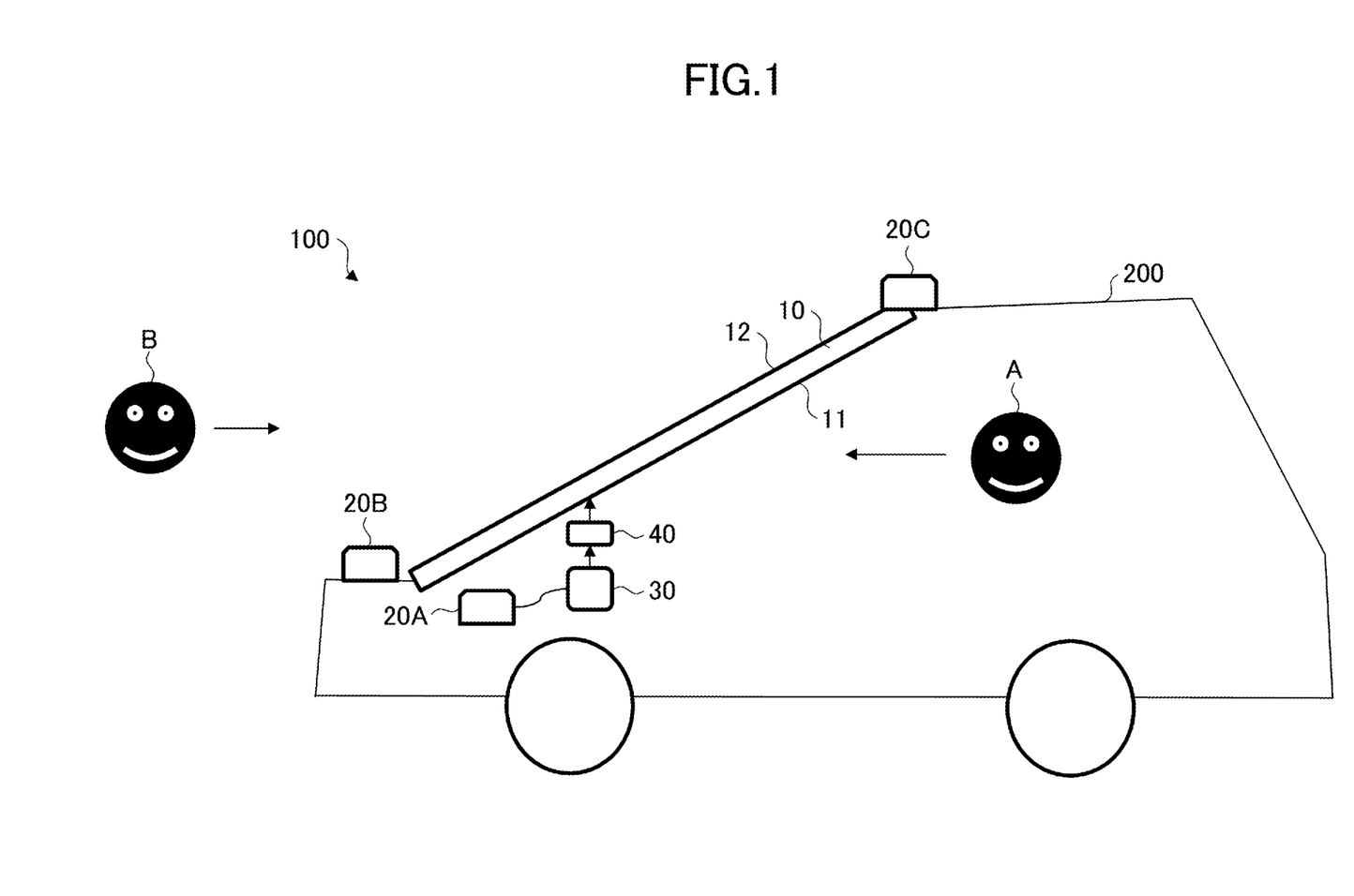
FIG. 1 is a schematic diagram illustrating a configuration example of a display system according to an embodiment.

FIG. 1 is a schematic diagram illustrating a display system according to an embodiment. A display system 100 illustrated in FIG. 1 suppresses rear show-through (the meaning of suppresses encompasses the elimination of rear show-through) by employing dimming (video luminance adjustment) with respect to a transparent display body 10 in accordance with a brightness of the transparent display body 10 or a brightness around the transparent display body 10. For example, the display system 100 controls luminance of video based on the brightness detected by at least one sensor such that the video displayed on the transparent display body 10 can be seen by a first observer A yet cannot be seen by a second observer B.

Although FIG. 1 illustrates as an example a case in which the display system 100 is mounted in a vehicle 200, the techniques described in the present specification are not limited to use for vehicles but are also applicable to applications other than vehicles. For example, the transparent display body onto which the video is displayed by the techniques of the present specification may be applied to transparent members such as window glass to be mounted in a vehicle, and the like, and may be applicable to transparent members such as window glass for buildings, showcases, display cases, glass doors, glass partitions, and the like. Also, the transparent display body may be provided on such a transparent member but is not necessarily provided on such a transparent member.

Figure 2:
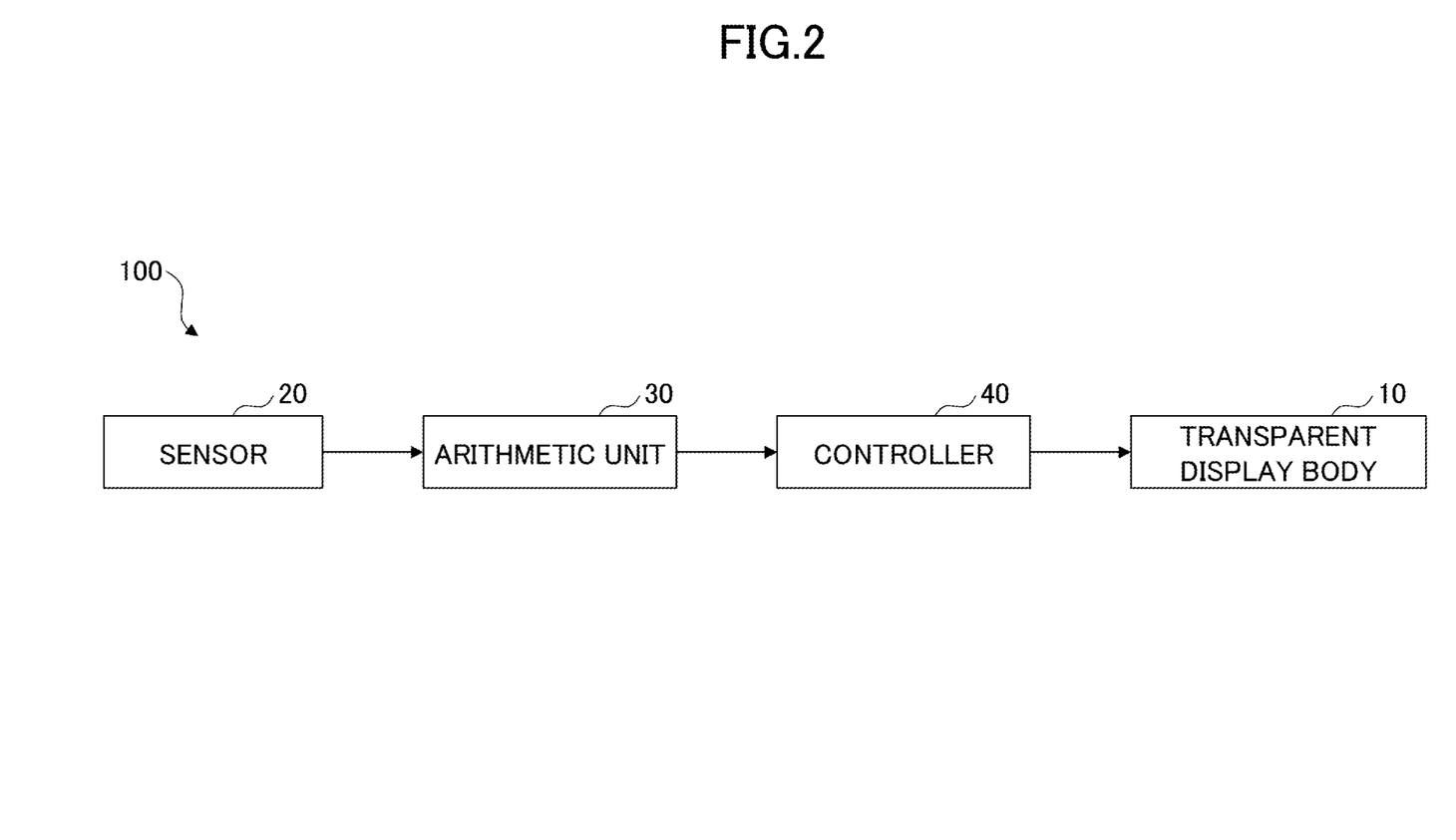
FIG. 2 is a block diagram illustrating a configuration example of a display system according to an embodiment.

FIG. 2 is a block diagram illustrating a configuration example of a display system of an embodiment. Next, the configuration example of the display system 100 is described with reference to FIGS. 1 and 2.

The display system 100 includes a transparent display body 10, sensors 20, an arithmetic unit 30, and a controller 40.

The transparent display body 10 is a plate shaped or film shaped device provided on a non-illustrated transparent member such as window glass. The transparent display body 10 is installed on a surface of or between transparent members such as window glass. The transparent member onto which the transparent display body 10 is installed is not limited to a windshield on the front side of the vehicle, and may include rear glass on the rear side of the vehicle, side glass on a side(s) of the vehicle, and roof glass on the roof of the vehicle.

The transparent display body 10 includes a display surface 11 onto which video is displayed and a rear surface 12 opposite to the display surface 11. The display surface 11 is an example of a first surface and the rear surface 12 is an example of a second surface. Hereinafter, the video displayed on the display surface 11 is also referred to as "video X". The transparent display body 10 may be a reflective-type transparent screen that enables the video X to be displayed on the display surface 11 by reflecting video light projected onto the display surface 11 or may be a self-emitting transparent display that displays the image X by self-emitting pixels. Also, a non-illustrated dimming member may be provided on the rear surface 12 side. In such a case, the various physical property values of the transparent display body 10 indicate the physical property values of the entirety of the transparent display body 10 including the dimming member.

In a case where the transparent display body 10 is the reflective-type transparent screen, it is preferable that visible light transmittance of the transparent display body 10 is greater than or equal to 20%, preferable that transmission haze of the transparent display body 10 is less than or equal to 20%, preferable that the surface roughness Ra of the display surface 11 is less than or equal to 1 μm, and preferable that the reflectance of the transparent display body 10 is greater than or equal to 8%.

Here, the transmission haze is measured in accordance with Japanese Industrial Standards (JIS K7136), and is derived as a percentage of transmitted light that has deviated by 2.5 degrees or more due to forward scattering among the light entered through the test plate, to be measured, in the plate thickness direction. As a light source to be used for measuring the transmission haze value, an illuminant D65 described in Japanese Industrial Standards (JIS Z8720:2012) is used.

The viewing angle in a case where the transparent display body 10 is a reflective-type transparent screen is preferably greater than or equal to 5 degrees. It is more preferable if the viewing angle is greater than or equal to 18 degrees because drivers of varying heights can be accommodated, and it is even more preferable if the viewing angle is greater than or equal to 50 degrees and less than or equal to 180 degrees because occupants other than the driver can also view the video. Here, the viewing angle represents a value obtained by doubling the angle at which the luminance is half the maximum luminance of the video. This half luminance of video is determined by shifting the luminance meter in a circumferential direction from a position at which the luminance of the video becomes maximum without changing the measuring point.

In contrast to this, examples of the self-emitting transparent display include micro light emitting diodes (LED) and mini LEDs. The aperture ratio in a case where the transparent display body 10 is a self-emitting transparent display is preferably greater than or equal to 20% in order to ensure sufficient video luminance, preferably greater than or equal to 50% in order to ensure transparency and sufficient video luminance, and preferably greater than or equal to 70% in order to further increase transparency. The aperture ratio represents a ratio of the light-emitting region in which minutely-sized light emitting elements are arrayed (a region excluding the non-light emitting region of the minutely-sized light emitting elements, the integrated circuit (IC) for driving the light emitting elements, wiring, and the like) to the transparent display surface.

The sensor 20 detects the brightness of the transparent display body 10 or the brightness around the transparent display body 10, and outputs a detection signal indicative of the detected brightness to the arithmetic unit 30. The sensor 20 may be an illuminance sensor that detects the illuminance of a surface onto which light is cast in the transparent display body 10 or around the transparent display body 10, and may be a luminance sensor that detects the luminance of the transparent display body 10 or the luminance around the transparent display body 10.

The sensor 20 is installed on the transparent display body 10 or in close proximity to the transparent display body 10. FIG. 1 illustrates an example of the installation locations of the sensor 20, the sensors 20 being installed in close proximity to the transparent display body 10. The sensor 20 may be a sensor 20A installed inside the vehicle such that the sensor 20A is situated under the transparent display body 10, may be a sensor 20B installed on the outside the vehicle such that the sensor 20B is situated on the lower side of the transparent display body 10, and may be a sensor 20C installed on the outside of the vehicle such that the sensor 20C is situated on the upper side of the transparent display body 10. The number of sensors 20 is not limited to one, and thus may be more than one.

The arithmetic unit 30 derives, based on the brightness detected by the sensor 20, the luminance caused by outside light (background luminance SB) as when the transparent display body 10 is viewed from the rear surface 12 side. The background luminance SB represents luminance due to specular-reflection light and diffuse-reflection light when the light reflected by the transparent display body 10 among the outside light (specular-reflection light) and the light diffused by the transparent display body 10 among the outside light (diffuse-reflection light) as viewed from the rear surface 12 side (side of the observer B).

In a case where the sensor 20 is a luminance sensor that detects background luminance SB or a luminance correlating with the background luminance SB, the arithmetic unit 30 may derive the background luminance SB based on the detection signal representing the detected luminance. Alternatively, in a case where the sensor 20 is an illuminance sensor that detects the ambient illuminance E of the transparent display body 10, the arithmetic unit 30 may derive the background luminance SB corresponding to the detected ambient illuminance E. For example, in a case where the sensor 20 is a sensor that detects the ambient illuminance E on the rear surface 12 side, the arithmetic unit 30 calculates the background luminance SB corresponding to the detected ambient illuminance E, by using the reflectance of the transparent display body 10.

Figure 8:
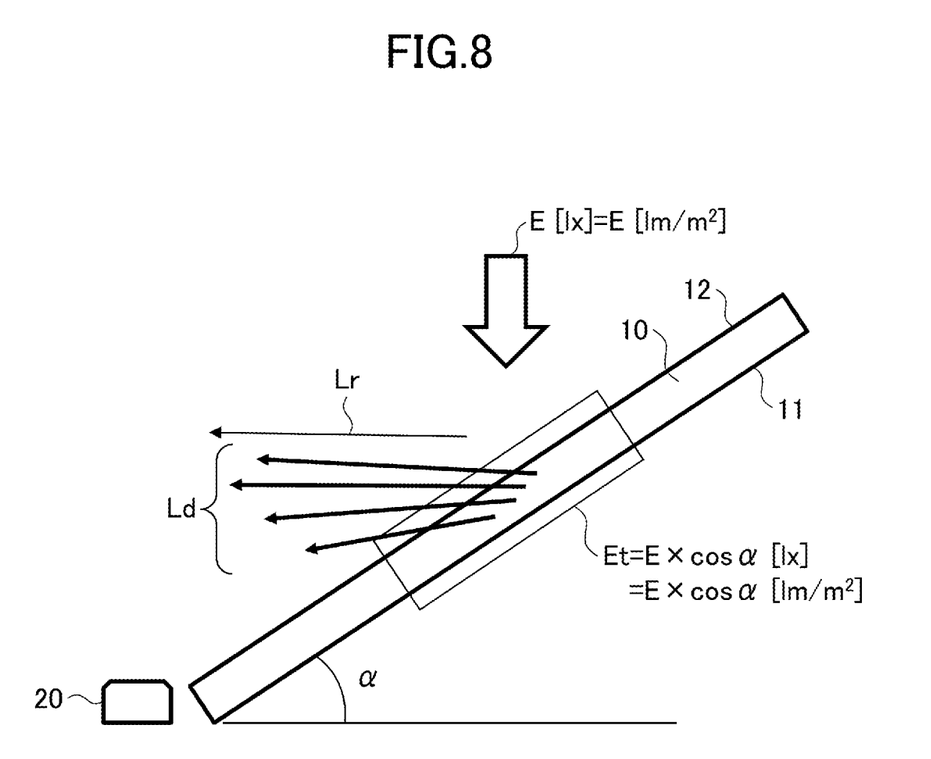
FIG. 8 is a diagram for describing an example of a method by which a background luminance is calculated based on ambient illuminance.

FIG. 8 is a diagram for describing an example of a method by which a background luminance SB is calculated based on the ambient illuminance E outside the vehicle. The ambient illuminance outside the vehicle is E, the a is the tilt angle of the transparent display body 10 attached to the windshield with respect to a horizontal plane, Rr is the specular reflectance of the transparent display body 10, and Rd is the diffuse reflectance of the transparent display body 10. Specular reflectance is a value obtained by performing a reflectance measurement as described in Japanese Industrial Standards (JIS D5705-1993). Diffuse reflectance is a value obtained by performing a measurement described in Japanese Industrial Standards (JIS K5500). In this case, since the illuminance Et from the illumination emitted onto the transparent display body 10 attached to the windshield is expressed as E×cos ∝, the background luminance SB is represented by a value obtained by the sum of the luminance due to the specular reflection light Lr of the ambient light (E×cos ∝×Rr) and the luminance due to the diffuse reflection light Ld of the ambient light (E×cos ∝×Rd) multiplied by constant γ. In other words, the arithmetic unit 30 can calculate the background luminance SB based on the detection value of the ambient illuminance E on the outside of the vehicle in accordance with calculation formula (A) "SB= (E×cos α×Rr+E×cos ∝×Rd)×γ".

It should be noted that the constant γ is a constant determined by the position of an observer outside of the vehicle who is not to be shown rear show-through. As an example of the method for determining the constant, γ may be determined so as to satisfy the calculation formula (A) by measuring in advance the background luminance SB as viewed at a position of a person outside of the vehicle who is not to be shown rear show-through. As the position of the person outside of the vehicle who is not to be shown rear show-through, a position where the rear show-through luminance is maximum may be selected, or a position where the background luminance SB is low may be selected. The position where the rear show-through luminance is maximum may be in a direction normal to a video projector of the windshield. For example, as a position where the background luminance SB is low, where the front surface of the windshield is at an azimuth angle of 0 degrees by arranging the windshield such that the direction normal to the windshield is south, a position at which the azimuth angle is ±80 degrees and the elevation angle is 0 degrees may be used as the sun is crossing the meridian. In a case where the sensor 20 is installed inside the vehicle, the ambient illuminance E on the outside of the vehicle may be calculated by taking into account the transmittance T of the transparent display body 10. For example, the ambient illuminance E on the outside of the vehicle may be calculated by dividing ambient illuminance E' measured on the inside of vehicle by T.

The arithmetic unit 30 is, for example, an electronic control unit (ECU) that includes a processor such as a central processing unit (CPU) and memory for storing programs.

Each of the functions of the arithmetic unit 30 is implemented by operating the processor by a program readably stored in the memory.

In FIGS. 1 and 2, the controller 40 displays the video X on the display surface 11 in accordance with the arithmetic results obtained by the arithmetic unit 30. In a case where the transparent display body 10 is a reflective-type transparent screen, the controller 40 is a projector that projects light for video onto the display surface 11. The projector is attached directly to the transparent display body 10 or is attached apart from the transparent display body 10. As types of projectors, there is a long-focus projector and a short-focus projector, and a projector suited for the application is selected. In the case where the transparent display body 10 is a self-emitting transparent display, the controller 40 is a plurality of light emitting elements that illuminate the respective pixels. The multiple light emitting elements are provided in the transparent display body 10.

The controller 40 controls video luminance FB, i.e. a luminance of the video X that is to be displayed on the display surface 11, in accordance with the background SB derived by the arithmetic unit 30 such that contrast C(=BB/SB) is less than or equal to a predetermined contrast. In the contrast C, BB represents the luminance of the video X (rear show-through luminance) that occurs on the rear surface 12 side, whereas SB represents the luminance (background luminance) caused by outside light as when the transparent display body 10 is viewed from the rear surface 12 side. The rear show-through luminance BB represents the luminance of video (rear show-through video) at which the video X unwantedly shows up on the rear surface 12. A control signal that controls the rear show-through video FB is input from the controller 40 thereby causing (BB/SB) of the transparent display body 10 to be less than or equal to the predetermined contrast value.

Since a reduced contrast C (=BB/SB) can suppress rear show-through of the video X, any rear show-through video is difficult to be noticed by the observer B. As a result, the privacy of the intended observer A who is to observe the video X can be ensured.

Since the denominator value (that is, the background luminance SB) of the contrast C changes in response to the brightness around the transparent display body 10, the controller 40 causes the numerator value (that is, the rear show-through luminance BB) of the contrast C to change in response to this change of the denominator value by adjusting the video luminance FB. For example, when the area around the transparent display body 10 darkens, the background luminance SB becomes smaller, and thus the contrast C increases unless some adjustment is made to the video luminance FB. As a result, the observer B is more likely to notice the rear show-through video, and consequently there is risk of the video X, viewable by the observer A, being unwantedly viewed by the observer B. Thus, if the background luminance SB decreases, controller 40 decreases the video luminance FB such that the contrast C is less than or equal to the predetermined contrast value, thereby reducing any rear show-through luminance BB. As a result, the contrast C can be suppressed from increasing, and thus rear show-through of the video X can be suppressed.

As described, the display system 100 includes the controller 40 that controls the video luminance FB in response to changes in the background luminance SB such that the contrast C is less than or equal to the predetermined contrast value (or, such that the contrast C does not exceed a predetermined contrast value). By doing so, rear show-through can be suppressed, thereby ensuring the privacy of the intended observer A who is to observe the video X.

The controller 40 may control the video luminance FB based on the background luminance SB derived by the arithmetic unit 30 such that the contrast C converges to a constant value less than or equal to the predetermined contrast value. Thus, rear show-through can be suppressed in a state where the contrast C is maintained at a constant value even when the background luminance SB fluctuates.

Figure 3:
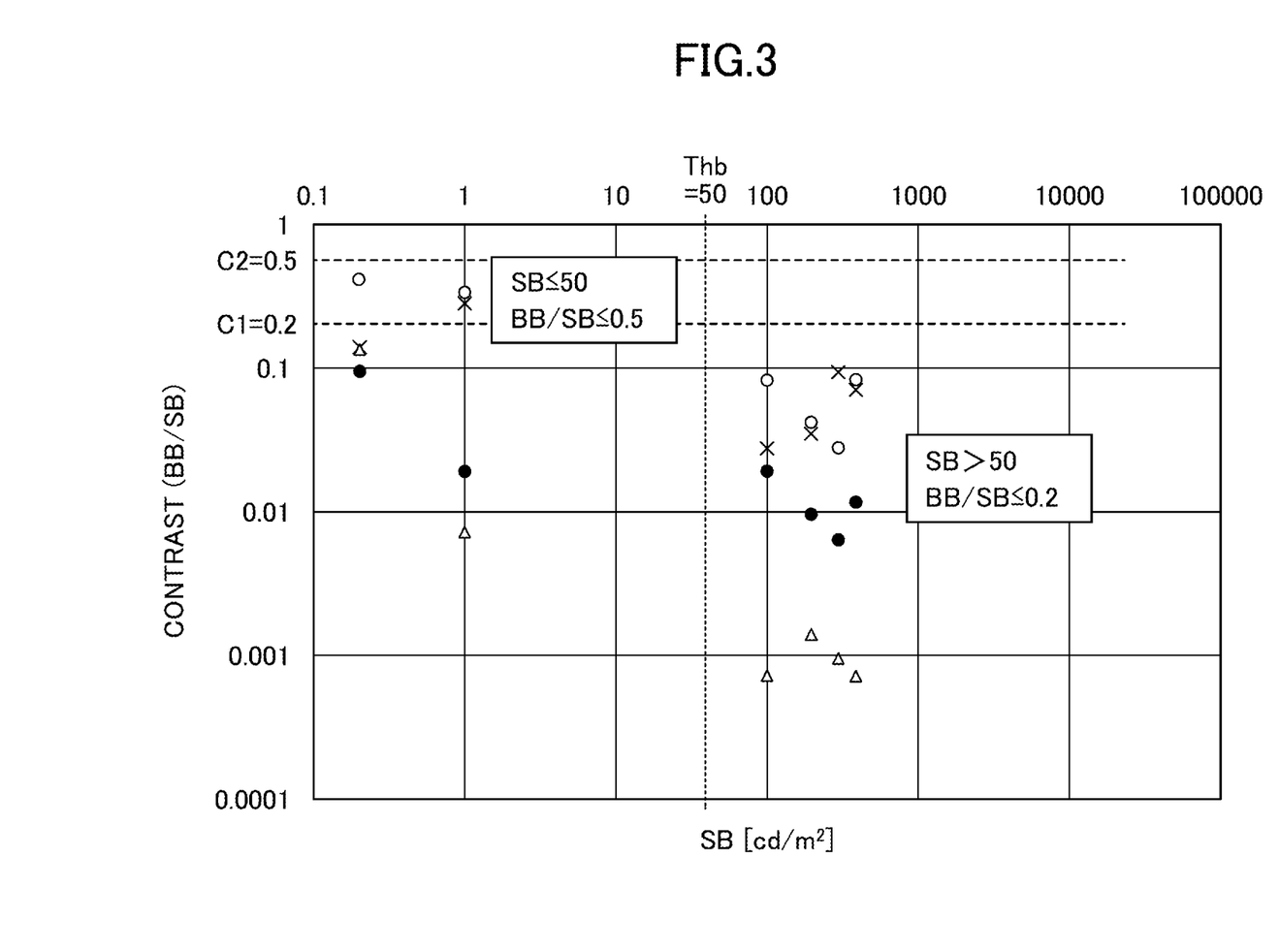
FIG. 3 is a drawing illustrating an example of a relationship between contrast and background luminance where rear show-through is not noticeable or difficult to be noticed.

FIG. 3 is a diagram illustrating an example of a relationship between the contrast C and the background luminance SB where rear show-through of the video X is not noticeable or difficult to be noticed by the observer B. The symbol "○" is a plotting of the relationship between the contrast C and the background luminance SB where rear show-through of the video X in white is not noticeable or difficult to be noticed by the observer B. The symbol "•" is a plotting of the relationship between the contrast C and the background luminance SB where rear show-through of the video X in the color red is not noticeable or difficult to be noticed by the observer B. The symbol "x" a plotting of the relationship between the contrast C and the background luminance SB where rear show-through of the video X in the color green is not noticeable or difficult to be noticed by the observer B. The symbol "Δ" is a plotting of the relationship between the contrast C and the background luminance SB where rear show-through of the video X in the color blue is not noticeable or difficult to be noticed by the observer B.

TABLE 1

| Background luminance | SB > 50 | | | | SB ≤ 50 | |
|---|---|---|---|---|---|---|
| [cd/m$^2$] | 400 | 300 | 200 | 100 | 0.2 | 1 |
| White | 0.0825 (0.3) | 0.0275 (0.075) | 0.04125 (0.075) | 0.0825 (0.075) | 0.4125 (0.00075) | 0.33 (0.003) |
| Red | 0.0117 (0.75) | 0 00625 (0.3) | 0.009375 (0.3) | 0.01875 (0.3) | 0 09375 (0.003) | 0.01875 (0.003) |
| Green | 0.06945 (0.3) | 0.0926 (0.3) | 0.034725 (0.075) | 0.02778 (0.03) | 0.1389 (0.0003) | 0.2778 (0.003) |
| Blue | 0.00072 (0.3) | 0.00099 (0.3) | 0.0014 (0.029) | 0.00012 (0.075) | 0.132 (0.028) | 0.0072 (0.0075) |

Figure 5:
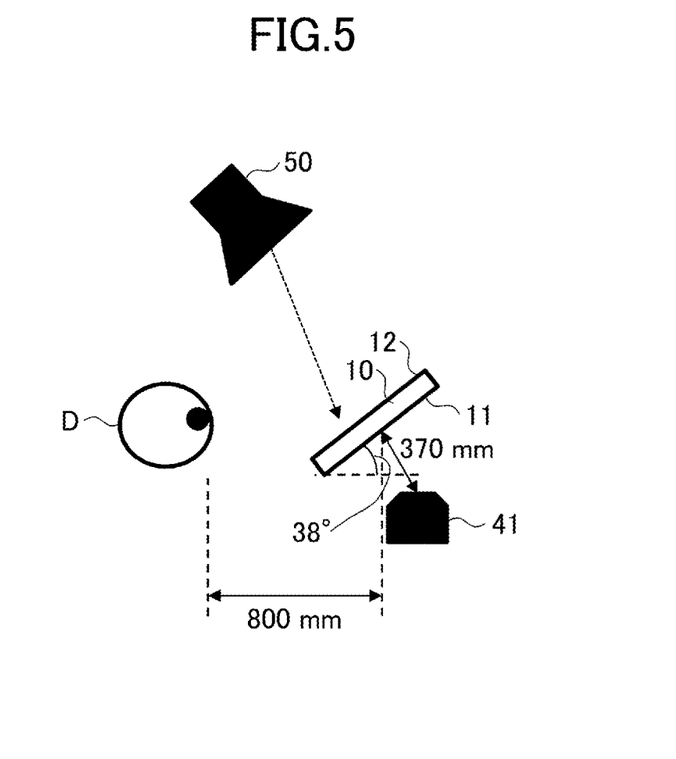
FIG. 5 is a schematic side view illustrating an example of an evaluation system.
Figure 6:
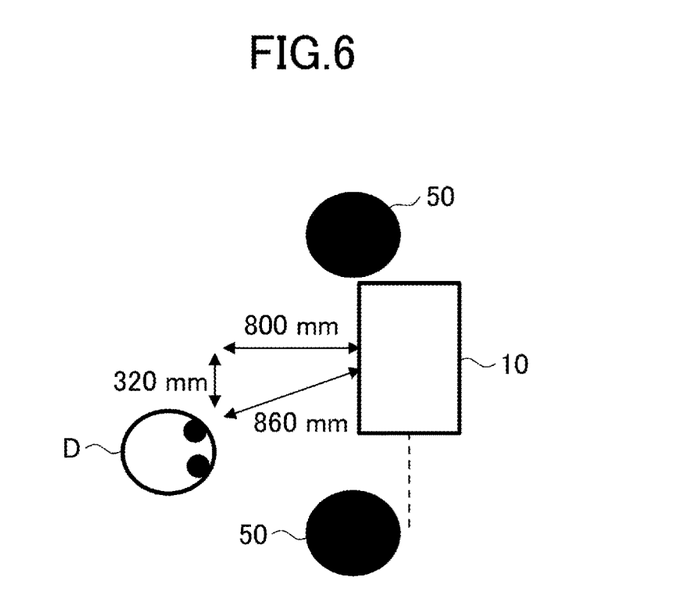
FIG. 6 is a schematic overhead view illustrating an example of the evaluation system.

Table 1 illustrates data of each of the plot points in FIG. 3. The numerical value in parentheses in Table 1 indicates (rear show-through luminance BB/rear show-through luminance upper limit value BBmax). The rear show-through upper limit value BBmax is rear show-through of the transparent display body 10 when dimming is not performed. The plot points in FIG. 3 are data obtained by an evaluation system set up in a dark room. FIG. 5 is a schematic side view illustrating the evaluation system. FIG. 6 is a schematic overhead view of the evaluation system.

<Evaluation System>

The transparent display body 10: transparent screen

The controller 40: the projector 41 (long-focus projector; manufactured by CASIO); XJ-A257)

Transparent screen features: transmittance 71%, haze 1.4%, and screen gain 0.5

Characteristics of the projector 41: 3000 lumens

Background luminance SB caused by outside light: controlled by adjusting the intensity of a light source 50 (measured under the conditions of 0.2, 1, 100, 200, 300, and 400 [cd/m$^2$].

Rear show-through luminance BB: light of the projector 41 is adjusted by passing the light through ND filters (absorption, SIGMAKOKI CO., LTD.; AND-50C-001, AND-50C-01, AND-50C-10, AND-50C-50) using the usage conditions of the ND filters: none, 50%, 10%, 5%, 1%, 0.5%, 0.1%, 0.05%, 0.01%, 0.005%, and 0.001%)

Video luminance FB: light of the projector 41 is adjusted by passing the light through the aforementioned ND filters.

<Flow of Evaluation>

With the background luminance SB set to 400 [$cd/m^2$], the luminance of rear show-through video is gradually increased starting from a state where rear show-through cannot be seen, and then when the rear show-through video for all of the colors is visible, the next background luminance is set, and the same evaluation is performed again.

<Determination as to Whether Rear Show-Through is Visible>

Figure 7:
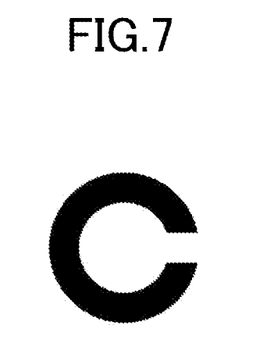
FIG. 7 is a diagram illustrating a Landolt ring.

If a correct response is given with respect to the direction of the gap in the Landolt ring illustrated in FIG. 7, it is deemed that the rear show-through is visible, whereas if an incorrect response is given, it is deemed that the rear show-through is not visible. The shape of the Landolt ring is as follows.

Diameter: 60 mm
Inner diameter: 31 mm
Width size of the gap: 24 mm

Measurements were performed at a distance of 860 mm from the subject D to the Landolt ring. In this case, measurements were performed with people having visual acuity of 0.01 (visual acuity converted based on JIS T7309) at a visual angle at 1.6 degrees. The measurement was performed with the subject D in a state of having visual acuity that is greater than or equal to 0.1 at the time of measurement (wearing glasses or contacts).

<Flow of Measurement>

Measurement was performed by displaying nothing for three seconds and then displaying the Landolt ring for one second, and this was conducted repeatedly for a total of four times (red, green, blue, and white). As the definition of the colors, the color coordinates of the color space color coordinates specified by the Commission internationale de l'éclairage (CIE) is used. The color coordinates are: red (0.613,0.326); green (0.326,0.605); blue (0.153,0.022); and white (0.286,0.368). Each of the plot points in FIG. 3 represents an average value of contrast for two cases encompassing when the number of people who could see the Landolt ring among 10 subjects D switched from 0 to 6 people (i.e. first of the two cases) to 7 to 10 people (i.e. second of the two cases).

As illustrated in FIG. 3, it is conceivable that the contrast value at which the Landolt ring becomes non-visible differs depending on the background luminance SB because the optic nerve cells that predominantly act change. Specifically, the brighter the surrounding environment is (that is, the greater the background luminance SB is), the more dominate cone cells become in terms of functionality. Conversely, the darker the surrounding environment is (that is, the lower the background luminance SB is), the more dominant rod cells become relative to cone cells in terms of functionality. Cone cells function in bright environments and make it possible to distinguish between colors. Rod cells function in dark environments. Although it is difficult to distinguish colors with rod cells, they make it possible to distinguish differences in brightness.

As such, the controller 40 controls the video luminance FB such that (BB/SB) is less than or equal to the first contrast value C1 when the background luminance SB derived by the arithmetic unit 30 is greater than a predetermined background luminance threshold Thb. Conversely, when the background luminance SB derived by the arithmetic unit 30 is less than or equal to the background luminance threshold Thb, the controller 40 controls the video luminance FB such that (BB/SB) is less than or equal to a second contrast value C2 that is greater than the first contrast value C1. In the manner described above, a surrounding brightness-based highly-accurate rear show-through suppression function can be achieved by changing the threshold of the contrast C in accordance with the level of the background luminance SB.

For example, when the background luminance SB derived by the arithmetic unit 30 is greater than Thb (=50 $cd/m^2$), the controller 40 controls the video luminance FB such that (BB/SB) is less than or equal to C1 (=0.2). By performing control in this manner, rear show-through of the video X can be appropriately suppressed in a relatively bright environment. Conversely, when the background luminance SB derived by the arithmetic unit 30 is less than or equal to Thb (=50 $cd/m^2$), the controller 40 controls the video luminance FB such that (BB/SB) is less than or equal to C2 (=0.5). By performing control in this manner, rear show-through of the video X can be appropriately suppressed in a relatively dark environment.

The controller 40 controls the video luminance FB such that the contrast C (=BB/SB) is greater than or equal to 0. That is, the lower limit value of the contrast C may be 0. For example, in a snow wall facing environment, the background luminance SB is approximately 20,000 [$cd/m^2$], and thus the contrast C would be a value extremely close to 0.

When the background luminance SB derived by the arithmetic unit 30 is greater than 50 $cd/m^2$, the controller 40 preferably controls the video luminance FB such that the contrast C is less than or equal to 0.1 and more preferably controls the video luminance FB such that the contrast C is less than or equal to 0.08, from the standpoint of making the video X more noticeable as viewed from the inside of the vehicle. Conversely, when the background luminance SB derived by the arithmetic unit 30 is less than or equal to 50 $cd/m^2$, the controller 40 more preferably controls the video luminance FB such that the contrast C is less than or equal to 0.4 from the standpoint of making the video X more noticeable as viewed from the inside of the vehicle.

TABLE 2

| | SB [$cd/m^2$] | |
| --- | --- | --- |
| | Range greater than 50 $cd/m^2$ (Average of 100 and 400 $cd/m^2$) | Less than or equal to 50 $cd/m^2$ (Average of 0.2 and 1 $cd/m^2$) |
| White | (BB/SB) < 0.08 | (BB/SB) < 0.4 |
| Red | (BB/SB) < 0.02 | (BB/SB) < 0.06 |
| Green | (BB/SB) < 0.05 | (BB/SB) < 0.2 |
| Blue | (BB/SB) < 0.0007 | (BB/SB) < 0.07 |

Table 2 indicates the results of individual contrast C thresholds by difference in background luminance and color based on the data of Table 1.

The column on the left in Table 2 indicates the values obtained by averaging the value of contrast C in the case where the background luminance SB [$cd/m^2$] of Table 1 is 100 and the value of contrast C in the case where the background luminance SB [$cd/m^2$] of Table 1 is 400 when the background luminance SB derived by the arithmetic unit 30 is greater than 50 $cd/m^2$. The column on the right in Table 2 indicates the values obtained by average the value of contrast C in the case where the background luminance SB

[cd/m²] of Table 1 is 0.2 and the value of contrast C in the case where the background luminance SB [cd/m²] of Table 1 is 1 when the background luminance SB derived by the arithmetic unit 30 is less than or equal to 50 cd/m².

According to Table 2, when the background luminance SB derived by the arithmetic unit 30 is greater than 50 cd/m², the controller 40 preferably controls the video luminance FB such that the contrast C is less than or equal to 0.08 from the standpoint of making the white portion of the video X difficult to be noticed by the observer B. Also, the controller 40 preferably controls the video luminance FB such that the contrast C is less than or equal to 0.05 from the standpoint of making the color green for which humans have the highest visual acuity hard to be noticed by the observer B. Also, the controller 40 preferably controls the video luminance FB such that the contrast C is less than or equal to 0.02 from the standpoint of making the red color portion of the video X difficult to be noticed by the observer B. Also, the controller 40 preferably controls the video luminance FB such that the contrast C is less than or equal to 0.0007 from the standpoint of making the blue color portion of the video X difficult to be noticed by the observer B.

According to Table 2, conversely, when the background luminance SB derived by the arithmetic unit 30 is less than or equal to 50 cd/m², the controller 40 preferably controls the video luminance FB such that the contrast C is less than or equal to 0.4 from the standpoint of making the white portion of the video X difficult to be noticed by the observer B. Also, the controller 40 preferably controls the video luminance FB such that the contrast C is less than or equal to 0.2 from the standpoint of making the color green for which humans have the highest visual acuity hard to be noticed by the observer B. Also, the controller 40 preferably controls the video luminance FB such that the contrast C is less than or equal to 0.06 from the standpoint of making the red color portion of the video X difficult to be noticed by the observer B. Also, the controller 40 preferably controls the video luminance FB such that the contrast C is less than or equal to 0.07 from the standpoint of making the blue color portion of the video X difficult to be noticed by the observer B.

Figure 4:
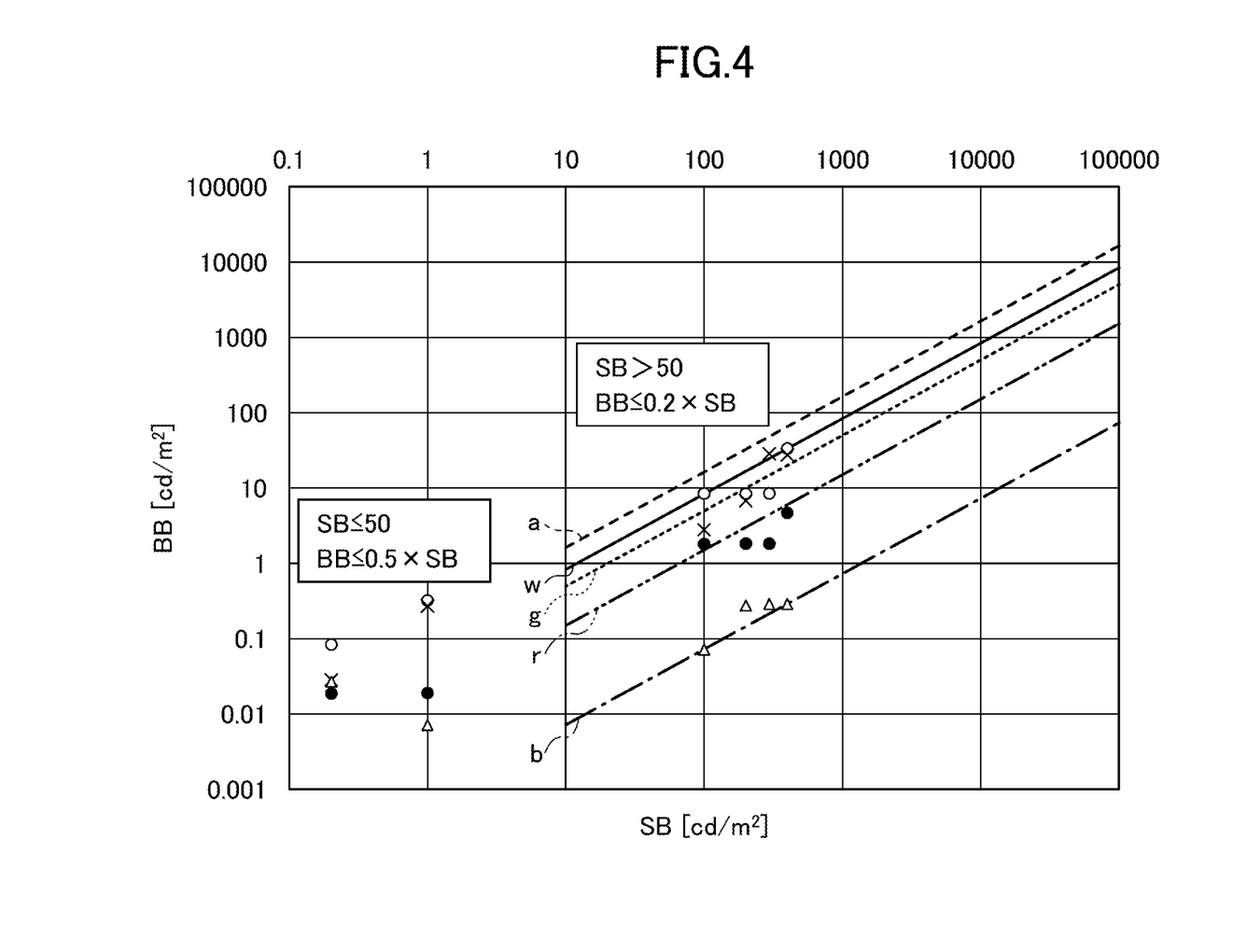
FIG. 4 is a drawing illustrating an example of a relationship between rear show-through luminance and background luminance where rear show-through is not noticeable or difficult to be noticed.

FIG. 4 is a drawing illustrating an example of a relationship between rear show-through luminance BB and the background luminance SB where rear show-through of the video X is not noticeable or difficult to be noticed by the observer B. The symbol "o" is a plotting of the relationship between the rear show-through luminance BB and the background luminance SB where rear show-through of the video X in white is not noticeable or difficult to be noticed by the observer B. The symbol "." is a plotting of the relationship between the rear show-through luminance BB and the background luminance SB where rear show-through of the video X in the color red is not noticeable or difficult to be noticed by the observer B. The symbol "x" a plotting of the relationship between the rear show-through luminance BB and the background luminance SB where rear show-through of the video X in the color green is not noticeable or difficult to be noticed by the observer B. The symbol "Δ" is a plotting of the relationship between the rear show-through luminance BB and the background luminance SB where rear show-through of the video X in the color blue is not noticeable or difficult to be noticed by the observer B.

The primary line a represents the threshold line "BB=0.1×SB" at which rear show-through of the video X can be suppressed. The primary regression line w represents the threshold line at which rear show-through for the white portion of the video X in particular can be suppressed. The primary regression line represents the threshold line at which rear show-through for the green color portion of the video X in particular can be suppressed. The primary regression line r represents the threshold line at which rear show-through for the red color portion of the video X in particular can be suppressed. The primary regression line b represents the threshold line at which rear show-through for the blue color portion of the video X in particular can be suppressed. These threshold lines represent the threshold values of the rear show-through luminance BB when the background luminance SB is greater than 50 cd/m². The regression formula may be represented by a quadratic or higher order formula.

When the background luminance SB derived by the arithmetic unit 30 is greater than the background luminance threshold Thb, the arithmetic luminance BB such that (BB/SB) is less than or equal to a first contrast value C1. The controller 40 controls the video luminance FB such that the video luminance FB is a luminance value corresponding to the first rear show-through luminance BB. By performing control in this manner, rear show-through of the video X can be appropriately suppressed in a relatively bright environment. For example, when the derived background luminance SB is greater than the Thb (=50 cd/m²), the arithmetic unit 30 calculates the first rear show-through luminance BB such that (BB/SB) is less than or equal to C1 (=0.2). In this case, the first rear show-through luminance BB is equivalent to a specific value less than or equal to the rear show-through luminance BB obtained by substituting the derived background luminance SB into the primary line a "BB=0.2×SB".

Conversely, when the background luminance SB derived by the arithmetic unit 30 is less than or equal to the background luminance threshold Thb, the arithmetic unit 30 calculates a second rear show-through luminance BB such that (BB/SB) is less than or equal to the second contrast value C2. The controller 40 controls the video luminance FB such that the video luminance FB is a luminance value corresponding to the second rear show-through luminance BB. By performing control in this manner, rear show-through of the video X can be appropriately suppressed in a relatively dark environment. For example, when the derived background luminance SB is less than or equal to Thb (=50 cd/m²), the arithmetic unit 30 calculates the second rear show-through luminance BB such that (BB/SB) is less than or equal to C2 (=0.5). In this case, the second rear show-through luminance BB is equivalent to a specific value less than or equal to the rear show-through luminance BB obtained by substituting the derived background luminance SB into "BB=0.5×SB".

For example, in a case where the transparent display body 10 is a reflective-type transparent screen, $$FB=(BB \times R)/(H \times T)$$

where R is the reflectance of the transparent display body 10, H is the haze, and T is the transmittance, and thus the arithmetic unit 30 calculates the luminance value (video luminance FB) corresponding to the rear show-through luminance BB. The controller 40 controls the output intensity of the projected light such that video luminance FB is the luminance value calculated by the arithmetic unit 30.

In a case where the transparent display body 10 is a self-emitting transparent display, $$FB=BB/(R \times T)$$

where R is the reflectance of the transparent display body 10 and T is transmittance, and thus the arithmetic unit 30 calculates the luminance value (video luminance FB) corresponding to the rear show-through luminance BB. The controller 40 controls the output intensity of the light emitting elements such that the video luminance FB is the luminance value derived by the arithmetic unit 30.

Being able to control rear show-through, through dimming, such that the rear show-through is less than or equal to ½ of the upper limit value BBmax of the rear show-through is preferable in terms cost and ease in acquiring control means (ND filter, for example). Also, the controlling of rear show-through luminance BB such that the rear show-through is less than or equal to 1/10 the upper limit value BBmax of the rear show-through is preferable in that rear show-through cannot be seen during the daytime. Furthermore, the controlling of rear show-through luminance BB such that the rear show-through luminance BB is less than or equal to 1/1000 of the upper limit value BBmax of rear show-through luminance BB is preferable in that rear show-through cannot be seen even at night.

Incidentally, it is preferable that the controller 40 controls the video luminance FB such that (BB/FB) is less than or equal to a predetermined value G because the observer A can readily view the video X whereas it is difficult for the observer B to notice any rear show-through of the video X. For example, the predetermined value G is preferably set to 0.1 and more preferably set to 0.05.

Figure 9:
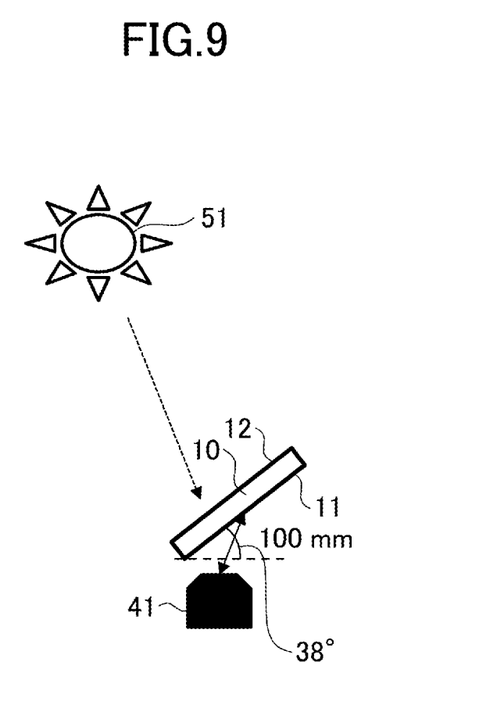
FIG. 9 is a schematic side view illustrating an evaluation system.

FIG. 9 is a schematic side view illustrating an example of an arrangement assuming actual use by setting (BB/SB) to less than or equal to the contrast value C1.

<Evaluation System>
Rear show-through luminance BB: 10 [cd/m$^2$]
Background luminance SB caused by outside light 51: 740 [cd/m$^2$]
Contrast C (=BB/SB): 0.013 (Less than or equal to a contrast value C1 (=0.2)
Video luminance FB: 2000 [cd/m$^2$]
BB/FB: 0.005
The controller 40: The projector 41 (Short-focus projector; manufactured by ASUS; P3B)

When the evaluation was performed under such conditions, a result could be obtained in which the observer A could readily view the video X whereas it was difficult for the observer B to notice any rear show-through of the video X.

In the embodiment, if a non-illustrated dimming member is provided on the rear surface 12 side of the transparent display body 10, the controller 40 can easily and accurately control the contrast C (=BB/SB) as result of the transmittance of the dimming member being easier to control in accordance with the background luminance SB. In such a case, the dimming member is not particularly limited as long as the dimming member can control transmittance. Examples of the dimming member include a guest-host type liquid crystal device, a polymer-dispersed liquid crystal device (SPD and the like), an electrochromic device, and the like. If a dimming member that can provide high transparency even when the power is off is used, this is preferable as a fail safe.

Hereinabove, although the display system, the display method, and the transparent display body are described in the above-noted embodiments, the present invention is not limited to these embodiments. Various modifications and improvements, such as combinations or replacements with a part or all of another embodiment, can be made within the scope of the present invention.

What is claimed is:

1. A display system, comprising:
 a transparent display body having a first surface and a second surface opposite to the first surface;
 a sensor to detect a brightness of the transparent display body or a brightness around the transparent display body;
 a processor configured to derive, based on the brightness detected by the sensor, a background luminance caused by outside light as when the transparent display body is viewed from a side of the second surface; and
 a controller to cause video to be displayed on the first surface,
 wherein where rear show-through luminance that is a luminance of the video that occurs on the side of the second surface is denoted as BB and the background luminance is denoted as SB, the controller controls a video luminance in accordance with the background luminance derived by the processor such that (BB/SB) is less than or equal to a predetermined contrast value, the video luminance being a luminance at which the video is to be displayed on the first surface.

2. The display system according to claim 1, wherein when the background luminance derived by the processor is greater than 50 cd/m$^2$, the controller controls the video luminance such that (BB/SB) is less than or equal to 0.2.

3. The display system according to claim 2, wherein when the derived background luminance is greater than 50 cd/m$^2$, the processor calculates a first rear show-through luminance BB such that (BB/SB) is less than or equal to 0.2, and
 wherein the controller controls the video luminance such that the video luminance is a luminance value corresponding to the first rear show-through luminance BB.

4. The display system according to claim 1, wherein when the background luminance derived by the processor is less than or equal to 50 cd/m$^2$, the controller controls the video luminance such that (BB/SB) is less than or equal to 0.5.

5. The display system according to claim 4, wherein when the derived background luminance is less than or equal to 50 cd/m$^2$, the processor calculates a second rear show-through luminance BB such that (BB/SB) is less than or equal to 0.5, and
 wherein the controller controls the video luminance such that the video luminance is a luminance value corresponding to the second rear show-through luminance BB.

6. The display system according to claim 1, wherein when the background luminance derived by the processor is greater than a background luminance threshold that is predetermined, the controller controls the video luminance such that (BB/SB) is less than or equal to a first contrast value, whereas when the background luminance derived by the processor is less than or equal to the background luminance threshold, the controller controls the video luminance such that (BB/SB) is less than or equal to a second contrast value that is greater than the first contrast value.

7. The display system according to claim 6, wherein when the background luminance derived by the processor is greater than the background luminance threshold, the processor calculates a first rear show-through luminance BB such that that (BB/SB) is less than or equal to the first contrast value, and the controller controls the video luminance such that the video luminance is a luminance value corresponding to the first rear show-through luminance BB, and
 wherein when the background luminance derived by the processor is less than or equal to the background luminance threshold, the processor calculates a second rear show-through luminance BB such that (BB/SB) is less than or equal to the second contrast value, and the controller controls the video luminance such that the video luminance is a luminance value corresponding to the second rear show-through luminance BB.

8. The display system according to claim 3, wherein the processor calculates the luminance value by using a reflectance and transmittance of the transparent display body.

9. The display system according to claim 1, wherein where the video luminance is denoted as FB, the controller controls the video luminance such that (BB/FB) is less than or equal to a predetermined value.

10. The display system according to claim 9, wherein the predetermined value is 0.1.

11. The display system according to claim 1, wherein the transparent display body has a dimming member on the side of the second surface.

12. A display method, comprising:
    detecting a brightness of a transparent display body or a brightness around the transparent display body, the transparent display body having a first surface and a second surface opposite to the first surface;
    deriving, based on the brightness detected by the sensor, a background luminance caused by outside light as when the transparent display body is viewed from a side of the second surface; and
    controlling, in a case where video is to be displayed on the first surface and where rear show-through luminance that is a luminance of the video that occurs on the side of the second surface is denoted as BB and the background luminance is denoted as SB, a video luminance in accordance with the derived background luminance such that (BB/SB) is less than or equal to a contrast value that is predetermined, the video luminance being a luminance at which the video is to be displayed on the first surface.

13. The display method according to claim 12, further comprising controlling transmittance of a dimming member in accordance with the background luminance, the dimming member being provided on the side of the second surface of the transparent display body.

14. A transparent display body comprising a first surface and a second surface opposite to the first surface, the transparent display body being for displaying video on the first surface, and the transparent display body characterized in that:
    where rear show-through luminance that is a luminance of the video that occurs on a side of the second surface is denoted as BB and a background luminance caused by outside light as when the transparent display body is viewed from a side of the second surface is denoted as SB, (BB/SB) becomes less than or equal to a predetermined contrast value in response to a control signal that controls a video luminance being input, the video luminance being a luminance at which the video is to be displayed on the first surface.

15. The transparent display body according to claim 14, wherein a dimming member is provided on the side of the second surface.

16. The transparent display body according to claim 14, further characterized in that video light projected onto the first surface is reflected to display the video.

17. The transparent display body according to claim 14, wherein the video is displayed by self-emitting pixels.

* * * * *